May 31, 1932.  H. J. TEMPLETON  1,861,197
MOVING PICTURE PROJECTOR
Original Filed June 30, 1926   3 Sheets-Sheet 1
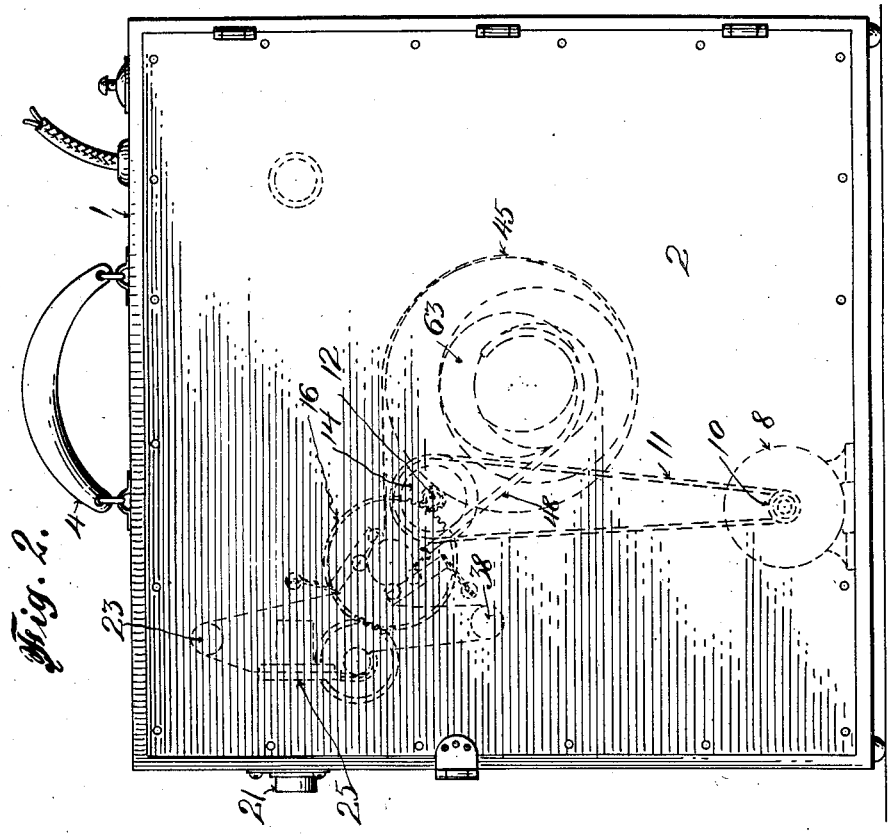
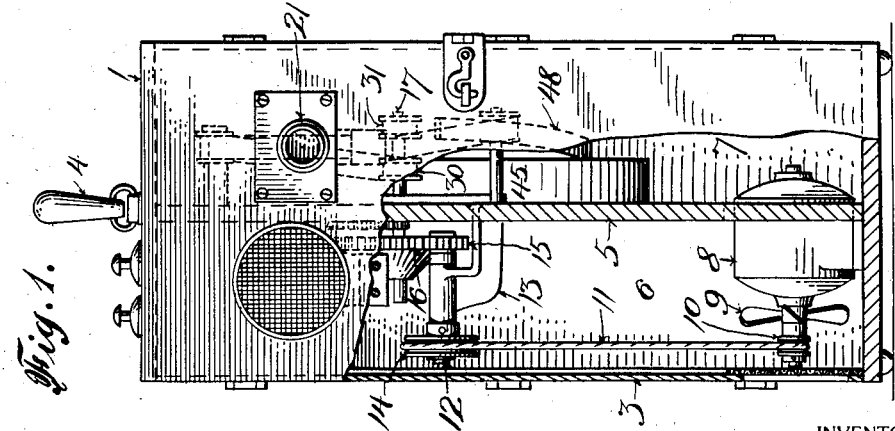
INVENTOR
Herbert J. Templeton
BY
Charles G. Hensley
ATTORNEY May 31, 1932.   H. J. TEMPLETON   1,861,197
MOVING PICTURE PROJECTOR
Original Filed June 30, 1926   3 Sheets-Sheet 2
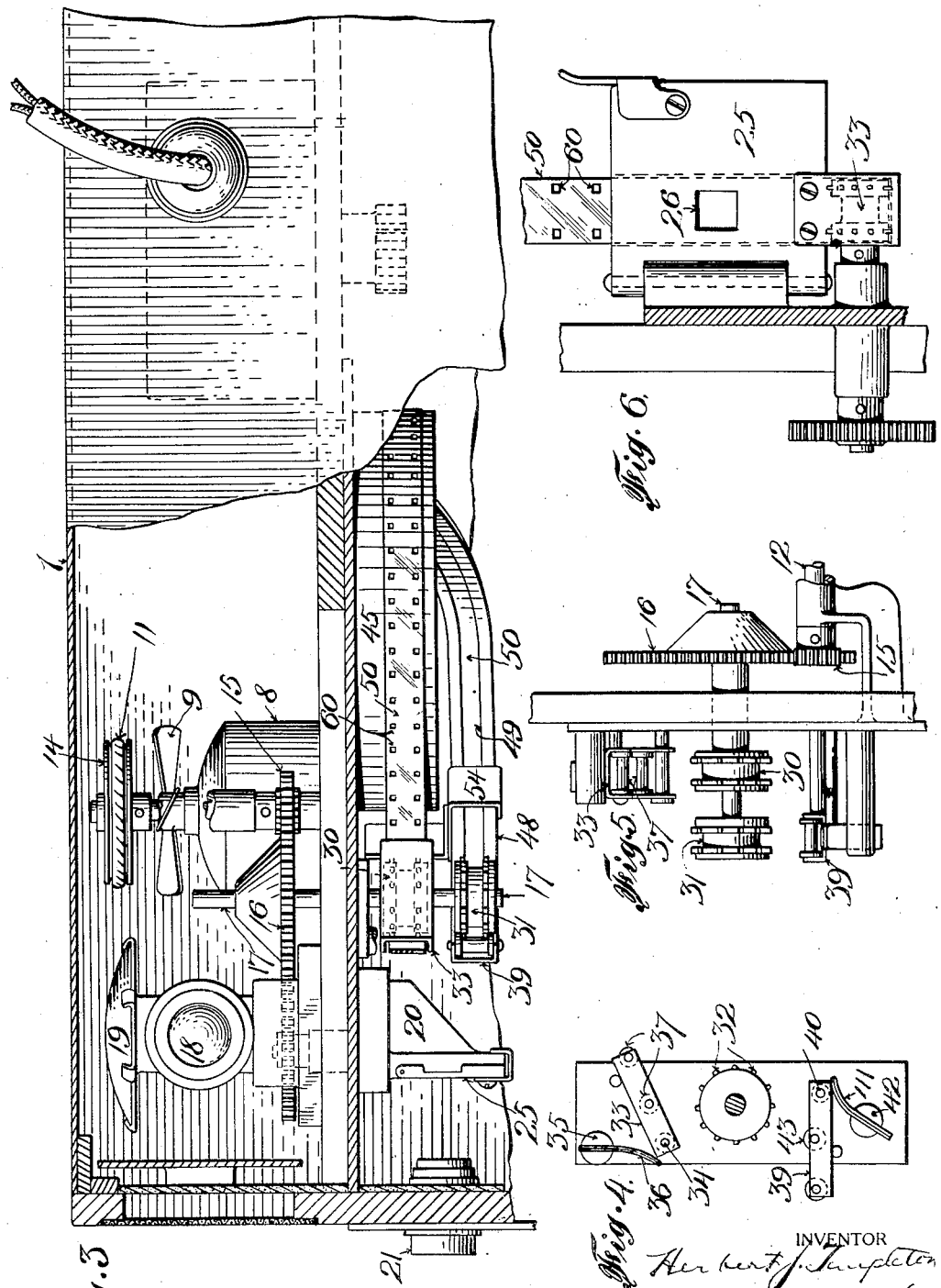

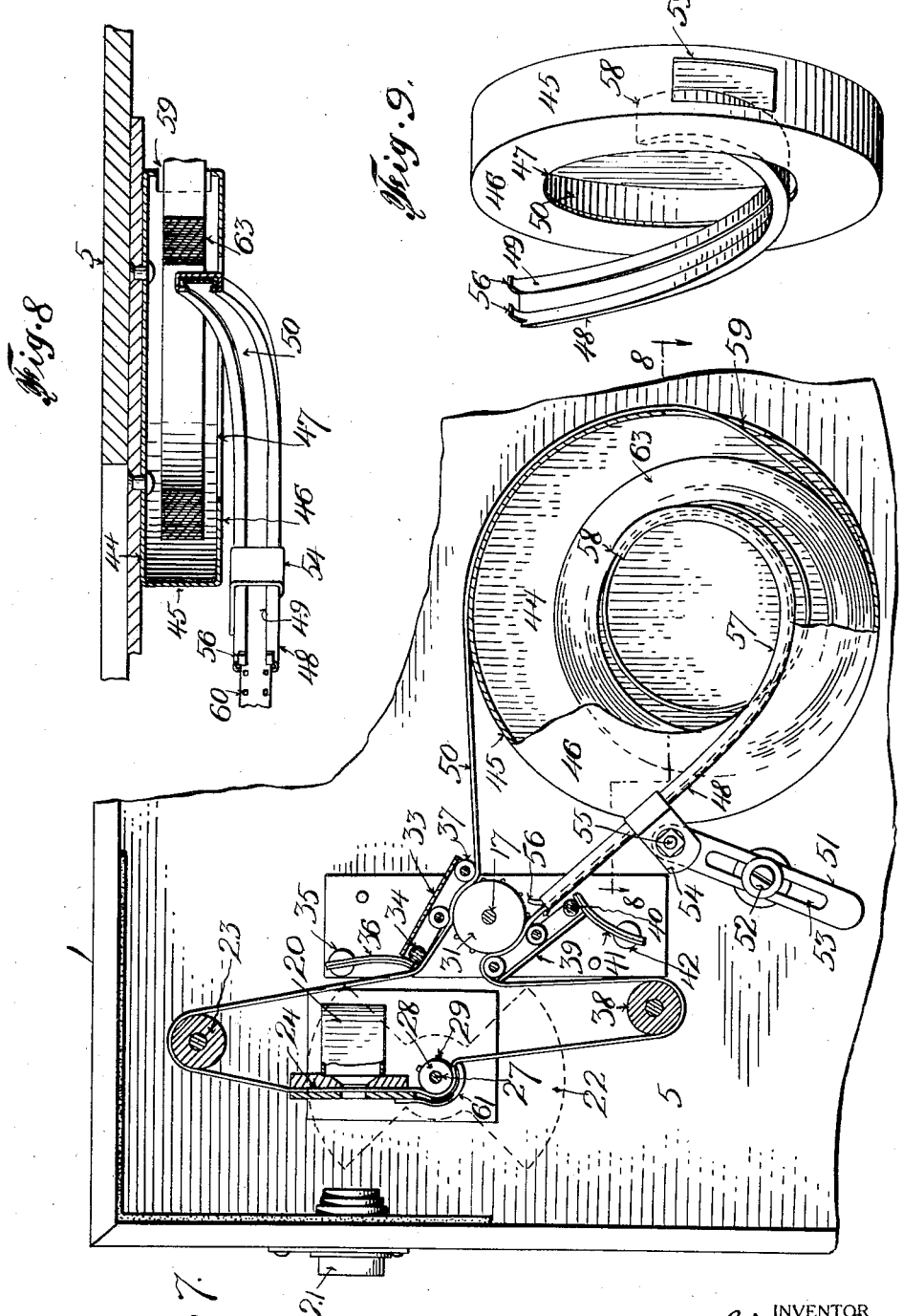

Patented May 31, 1932

1,861,197

UNITED STATES PATENT OFFICE

HERBERT J. TEMPLETON, OF BROOKLYN, NEW YORK, ASSIGNOR OF ONE-TENTH TO EDWARD C. O'DONNELL, OF NEW YORK, N. Y.

MOVING PICTURE PROJECTOR

Application filed June 30, 1926, Serial No. 119,601. Renewed October 23, 1931.

My invention relates to machines for projecting moving pictures. The object of the invention is to provide an apparatus for projecting pictures successively from a strip of film in such manner that the machine may be operated continuously over a long period of time. Another object is to provide a projector in which the film is automatically and continuously rewound. Heretofore, in arranging projecting apparatus for continuous operation over long periods of time, requiring the repetition of the entire strip of pictures, it has been proposed to join the ends of the film together to make the film continuous and to thread the film back and forth around a series of rollers in order that it might be operated repeatedly or continuously, regardless of the limited length of the film. Such devices are very cumbersome, difficult to drive, and they put a serious strain upon the film, causing it to break. With the present invention it is possible to arrange the greater part of the film in the form of a coil or reel, a portion of the film being threaded through the driving and projecting devices, and the ends of the film are connected together so that the film may be run continuously over long periods of time, during which the pictures are projected repeatedly. In fact, the present machine may be used for advertising or illustrative purposes and it may, with a single roll of film, be operated continuously, without attention, for a whole day. To accomplish this purpose I arrange the body of film in the form of a coil containing a number of layers, depending upon the length of the film, and this coil is arranged to revolve in a suitable holder in such manner that the coil of film "floats" in the holder. By this I mean that the film is not mounted upon a reel in the sense that the term is usually applied, with the reel driven at a definite speed because in such cases it is not possible to have the film continuous and operate continuously. Attempts have been made to provide a coil of film mounted on a reel or spool which is driven at a definite speed, and to have the film feed off from the interior of the coil to the projecting apparatus, and upon returning from the projecting apparatus, to feed back to the outer side of the coil on the reel. The difficulty with that type of device is that where the reel is driven at a definite speed, the peripheral speed of a coil of film at the inside or adjacent the reel is different from the peripheral speed at the outside coil, so that after a continued operation the film will either bind and break and fail to feed to the projecting apparatus, or a slack will be formed between the projecting apparatus and the coil, until the entire strip of film is removed from the reel. Under the present invention the coil of film is floating and it is propelled through a drawing action on the film itself. The film is taken off from the outer portion of the coil to feed to the projecting apparatus, and it is returned through a suitable chute to the interior of the coil. The coil of film in revolving is subject to a slipping action between the several turns, so that the inner turns of the coil gradually expand from the smaller diameter which they assume when fed to the interior of the coil, and gradually become larger until, by the time the coil becomes the outer turn of the reel, it is of the maximum diameter. By driving the coil of film through the film itself, it is possible to operate it as a continuous strip over long periods of time, so that the total length of the film is repeatedly fed through the projecting apparatus. This is accomplished without serious wear upon the film itself, and it is possible to use a film of much greater length than can be used with the forms of continuous projecting devices heretofore proposed. Other advantages and improvements will be set forth in connection with the following detailed description.

In the drawings forming part of this application,

Figure 1 is an end elevation of a portable projecting apparatus, including my invention, in which view a portion of the casing is broken away to show the interior parts, Figure 2 is a side elevation thereof, Figure 3 is a plan view with a portion of the casing broken away, Figure 4 is an enlarged detail view showing the guides for holding the film engaged with the feed sprockets, Figure 5 is an end view of the parts shown in Figure 4, Figure 6 is a detail view showing parts of the projecting apparatus, Figure 7 is a sectional view showing the principal parts of the film operating mechanism in end elevation, Figure 8 is a sectional view taken on the line 8—8 of Figure 7, and Figure 9 is a perspective view of the reel holder and chute.

While the mounting for the various parts is susceptible to various modifications, I have chosen to illustrate my invention in the form of a portable case in which the operating mechanism of the projecting apparatus is contained. I have shown the apparatus contained within a portable case 1 of rectangular shape, and having front and rear covers 2, 3 to provide access to the working parts of the apparatus; and I have also shown a handle 4 by means of which the case may be carried. Within the casing I have shown a vertical wall 5 dividing the same into a motor compartment 6 and into a second compartment 7 containing the projecting apparatus. Within the motor compartment I have shown an electric motor 8 provided on its shaft with a fan 9 for cooling and ventilating the interior of the case; and on the same shaft I have shown a pulley 10 over which engages a belt 11 for transmitting driving force from the motor to a shaft 12 mounted on the bracket 13 the latter shaft having a corresponding pulley 14 around which the belt 11 engages. The shaft 12 is provided with a pinion 15 fixed thereto, which meshes with and drives a gear 16 which is mounted upon a shaft 17 which projects through and has its bearings in the vertical wall 5. Within the compartment 6 there is also provided a lamp 18 arranged in front of a reflector 19 which serves to project the light from the lamp through an aperture in the wall 5 and into a prism contained within the casing 20; and this prism serves to turn the light rays at right angles, so that they pass through a picture area of the film as will be pointed out in detail hereinafter. From there the rays then pass through the lens arranged in the lens casing 21 and from the lens the light rays are projected onto a suitable screen (not shown) which may be arranged at a suitable distance from the apparatus. There is a revolving shutter 22 arranged to intercept the light between the lamp and the prism, and its function is the same as the shutters commonly used in the art; that is, it is adapted to shut off light rays from the screen during the period that the film is being shifted to present a new projecting area.

There is a guide roller 23 arranged above the prism case 20 and this is adapted to guide the film as it enters the slot 24 in the front wall of the prism case, this wall being provided as shown in Figure 6 with a frame 25 having a projecting aperture 26 corresponding in size to a picture area of the film. Below the frame there is a shaft 27 on which there is mounted a sprocket wheel 28 having pins 29 adapted to engage in the feed apertures along the margins of the film in well known manner; and this sprocket serves to draw the film through the frame 25. The sprocket 28 is operated intermittently by any well known mechanism such as a Geneva movement, well known in the art.

On the shaft 17 there are arranged two feed sprockets 30, 31 in parallel relation each having pins 32 to engage the feed apertures at opposite sides of the film and in the arrangement shown in the drawings these two sprockets are spaced apart on their shaft so that the sprocket 30 is in the same plane with the coil of film, whereas the sprocket 31 is disposed to one side of this plane, and in line with the chute which returns the film to the inside of the coil. For keeping the film engaged on these feed sprockets I have shown the following devices: There is a plate 33 U-shape in cross section, the flanges of which are pivoted upon a pin 34 in order to allow this plate to swing toward and from the sprocket 30 and on an arbor 35 there is a leaf spring 36 which acts on this plate to swing it toward its sprocket. Spaced rollers 37 are journaled on the flanges of this plate 33 and they engage the sprocket 30 between the teeth thereof in order to hold the film engaged with the teeth of this sprocket while the machine is in operation, as shown in Figures 2, 3 and 7. The film, where it leaves the sprocket 28 below the exposure frame, passes around an idler 38 which serves as a guide, and it then engages with the sprocket 31 and there is a device for holding the film engaged with this sprocket as follows: There is a plate 39 similar to the plate 33 and it is pivoted upon the pin 40 so that it swings toward and from the sprocket 31 and there is a leaf spring 41 attached to the arbor 42 and arranged to press the plate 39 toward the sprocket 31. This plate also has mounted in its flanges idler rollers 43 which engage the periphery of the sprocket 31 at different points, in order to hold the intermediate portion of the film engaged with the teeth of this sprocket. As the shaft 17 is driven by the motor, the sprockets 30, 31 serve to propel the film as it approaches the exposure frame and after it leaves the same.

The reel or coil receptacle, is shown as consisting of a cylindrical casing having a rear wall 44 and a cylindrical wall 45 extending therefrom, and an annular outer wall 46 having a central aperture 47 through which the returning portion of the film is adapted to be fed. While this reel box is preferably made cylindrical, it is not limited to this shape. There is a chute 48 comprising a supporting plate having its edges curved around as shown at 49 to engage the opposite side edges of the film 50. This chute is shown mounted upon an adjustable bracket 51 which is supported on the dividing wall 5 by means of a clamping screw 52 which engages in the longitudinal slot 53 of the bracket arm. There is a strap 54 surrounding and attached to the chute and at 55 this strap is bolted to the bracket by means of a bolt which permits of the adjustment of the angle of the strap, and therefore of the chute which it carries. The upper end of this chute is preferably located adjacent the point where the film leaves the sprocket 31 and at this point there are diverging guides 56 to guide the entry of the film into the chute slot. This chute extends downwardly adjacent the front face or annular wall 46 of the coil box, and at 57 the chute curves in helical shape so that the delivery end 58 of the chute extends within the coil box and this end curves approximately on the arc of the interior of the coil of film contained within the coil box. This end also terminates in the plane of the coil of film, within the film box, as is illustrated in Figures 7, 8 and 9. The coil box is provided in its cylindrical wall with an aperture 59 through which the film is adapted to pass from the outer turn of the coil in feeding to the sprocket 30 and I have found that the position of this slot, or the point at which the film leaves the coil, has a great deal to do with the success of operation of the device, I have found that this aperture 59, when arranged as shown at Figure 7, or nearly opposite the end of the chute, results in the most efficient operation of the device.

Operation

A coil of film is placed in the coil box in the position shown in Figures 7 and 8, and the film will be wound in such condition that the portion of the film to be first projected will be the outer layer of the coil. The outer end of the strip of film, coming from this coil, will be threaded through the aperture 59 in the coil box, and thence over the sprocket 30, and for this purpose the plate 33 may be swung into the position shown in Figure 4 to allow the film to be threaded; after which, the plate 33 is swung into the position shown in Figure 7 to hold the film against the periphery of the sprocket 30 with the teeth of the latter engaging the feed apertures 60 at the margins of the film. The end of the film is then passed over the idler 23, thence through the slot 24 in the exposure frame; thence partly around the sprocket 28 where it is held by a spring plate 61 in engagement with the sprocket. From there the end is carried around the idler 38, thence partly around the sprocket 31, and for this purpose the plate 39 may be swung into the position shown in Figure 4, after which the plate is swung back to press the film against the portion of the periphery of this sprocket. The end of the film is then passed through the slot in the chute 48 until it emerges at the end 58 and this end of the film is then joined with the inner end of the coil, so that the film becomes a continuous strip.

When it is desired to operate the projector, the lamp 18 is turned on, and the motor 8 is set into operation. The revolving of the shaft 17 and the sprockets carried thereby, will cause the film to be propelled so that the outer turn of the coil of film in the box is continually passing through the aperture 59, thence partly around the cylindrical wall 45 of the coil box, partly around the feed sprocket 30 and from there it passes through the exposure frame where each picture area is projected by the rays of light reflected from the prism 20 through the picture areas of the film, and through the lens 21 upon any screen or surface provided therefor. As the film leaves the exposure frame, it is intermittently propelled by the sprocket 28 and after passing around the idler 38 it travels partly around the sprocket 31, thence through the slot in the chute, and it is returned to the inner coil of the reel in the reel box. As set forth herein, the coil 63 floats, that is to say, it is subjected to the propelling action exerted upon the film itself, and it is mounted free, as distinguished from being revolved at a definite speed upon a spool or other mechanically revolved medium. In the construction shown in the drawings the coil 63 simply rests upon the inner surface of the circular wall 45 of the reel box, and if this surface is made very smooth, the friction of the coil revolving in contact with this surface will be very slight, and will cause no appreciable wear on the surface of the film. As the strip of film is propelled by the sprocket 30 and drawn from the outer portion of the coil, there is a direct pulling action in the plane of the coil, so that there is no tendency to distort the film, nor to pull unevenly on either side. This propelling action, due to the sprocket 30 will be at a speed exactly corresponding with the speed of projection of the pictures. The sprocket 31 which takes the film from the intermittent sprocket 28 propels this portion of the film, and it also exerts a pushing action thereon sufficient to push the film through the slot of the chute and to deliver it within the coil 63. The film is returned to the inner portion of the coil at the same speed the outer portion is removed. It will be obvious that the several turns or layers of the film constituting the coil 63 must slip in relation to each other in order to compensate for the difference in speed of the innermost and outer-most turns or layers of the film because of the different radii of the two circles. As there is very slight friction between the several layers of the coil of film, this gradual slipping may take place without undue wear on the film, and there is no appreciable resistance cause by this slipping action, or at least not sufficient to seriously affect the revolution of the coil as a whole. As the film is fed into the inner layer of the coil, which is of a smaller diameter than the outer layer, and as the speed with which it is fed to this inner layer is the same as the speed with which the outer layer is removed from the coil, this slipping action must obviously take place, and in the present construction and mode of operation the slipping action is gradual and is regulated solely by the speed of operation of the film itself, whereas in previous devices the speed of revolution of the coil has been controlled by a removable mechanical support for the film.

As the strip of film is continuous, the device may be operated over long periods of time, so that the entire film may be repeatedly projected. This makes it possible to use the device for advertising or display purposes where it is desired to repeatedly project the film automatically. The present device is very compact, very smooth in its operation, and it avoids the necessity of stopping the machine to rewind the film, or of storing the inactive portion of the film on a complicated set of rollers. The strain on the film in the present device, even where the coil 63 is of considerable size, is very light and therefore the life of the film when used in the present projector, is very long. With the use of the chute disposed as shown herein it is unnecessary to employ any structure inside the coil 63 of film. The inner radius of this coil remains quite uniform when the device is in operation.

Having described my invention, what I claim is:

1. In a projecting apparatus the combination of means for projecting pictures from a film, a continuous strip of film arranged in the form of a multi-layer coil, a portion of the film being arranged to be operated on by the projecting means, and a support for the coil comprising a circular coil box arranged in a vertical plane, a coil of film floating within and resting on the circular wall of said coil box and adapted to be revolved by a propelling force acting through the strip of film.

2. In a projecting apparatus the combination of means for projecting pictures from a film, a continuous strip of film arranged in the form of a coil, a portion of the film extending from the coil to be operated on by the projecting means, a coil support comprising a receptacle within which the coil is adapted to float and to be revolved by a propelling force acting through the strip of film, said receptacle having a circular outer wall over which the film engages as it passes from the outer layer of the coil and a chute for guiding the return portion of the film to the inner layer of said coil.

3. In a projecting apparatus the combination of means for projecting pictures from a film, a continuous strip of film arranged in the form of a coil, a portion of the film extending from the coil to be operated on by the projecting means, a support for the coil of film comprising a receptacle in which the coil is adapted to rest in floating condition while the same is being revolved by a propelling force acting through the strip of film, said support acting only on the outer portion of said coil, means for guiding the strip of film from the outer layer of said coil, and means for guiding the returning portion of said strip to the inner layer of the coil, said guiding means both operating adjacent the same side of said coil.

4. In a projecting apparatus the combination of means for projecting pictures from a film, a continuous strip of film arranged in the form of a multi-layer coil, a portion of the film arranged to be operated on by the projecting means, means for supporting said coil solely by exterior contact therewith and adapted to permit the coil to be revolved by a propelling force acting through the strip of film, the inner portion of the coil of film being free to expand and contract, means for guiding the strip of film from the outer layer of said coil to the projecting means, and means for guiding a portion of film coming from said projecting means to the inner layer of said coil.

5. In a projecting apparatus the combination of means for projecting pictures from a film, a continuous film arranged in the form of a multi-layer coil and having a portion of the film led from said coil and operated on by the projecting means, means for supporting the coil of film in a vertical position and so contacting with the exterior of said coil as to permit the outer convolutions thereof to freely expand and contract, and means for propelling the strip of film whereby it is taken off from the outer convolution and returned to the inner convolution of said coil and adapted to revolve said coil of film by the propelling action on said strip, the inner portion of said coil being unobstructed to permit the inner convolutions to expand and contract at will.

6. In a projecting apparatus the combination of means for projecting pictures from a film, a continuous strip of film arranged in the form of a multi-layer coil, a portion of the film being arranged to be operated on by the projecting means, a support for the coil comprising a coil box arranged in a vertical plane, said coil of film being arranged in a vertical plane within said box and supported solely by contact with the lower portion of the outer convolution of said coil and whereby the outer portion of said coil is adapted to freely expand and contract, and means for propelling the strip of film whereby it is taken off from the outer convolution and returned to the inner convolution of said coil and adapted to revolve said coil of film by the propelling action on said strip, the inner portion of said coil being unobstructed to permit the inner convolutions to expand and contract at will.

Signed at the city, county and State of New York, this 16th day of June, 1926.

HERBERT J. TEMPLETON.